(12) United States Patent
Chien

(10) Patent No.: US 8,834,009 B2
(45) Date of Patent: Sep. 16, 2014

(54) LED BULB HAS MULTIPLE FEATURES

(76) Inventor: Tseng-Lu Chien, Walnut, CA (US)

( * ) Notice: Subject to any disclaimer, the term of this patent is extended or adjusted under 35 U.S.C. 154(b) by 0 days.

(21) Appl. No.: 13/540,728

(22) Filed: Jul. 3, 2012

(65) Prior Publication Data
US 2013/0021795 A1    Jan. 24, 2013

Related U.S. Application Data

(63) Continuation-in-part of application No. 13/296,508, filed on Nov. 15, 2011, now Pat. No. 8,562,158, and a continuation-in-part of application No. 13/296,469, filed on Nov. 15, 2011, now Pat. No. 8,711,216.

(51) Int. Cl.
*F21S 2/00* (2006.01)

(52) U.S. Cl.
USPC ............... 362/642; 362/249.02; 362/800

(58) Field of Classification Search
USPC ............... 362/249.02, 3, 800, 642
See application file for complete search history.

(56) References Cited

U.S. PATENT DOCUMENTS 7,736,020 B2 *   6/2010   Baroky et al. ............ 362/249.02

* cited by examiner

*Primary Examiner* — Anabel Ton
(74) *Attorney, Agent, or Firm* — Bacon & Thomas, PLLC (57) ABSTRACT

An LED bulb illuminates or projects images to both nearby and faraway areas. In addition, the LED bulb includes such features as three-dimensional adjustability, focus adjustment, and an extendable feature that enables components to be moved away from heat generated by the LED, and from blocking means that would interfere with operation of the components.

12 Claims, 9 Drawing Sheets

LED BULB HAS MULTIPLE FEATURES

This application is a continuation-in-part of U.S. patent application Ser. No. 13/296,508, now U.S. Pat. No. 8,562,158, and Ser. No. 13/296,469, now U.S. Pat. No. 8,711,216, each filed Nov. 15, 2011 and incorporated herein by reference.

BACKGROUND OF THE INVENTION

The present application has subject matter in common with copending and patented applications of the inventor that are directed to (1) a projection light, (2) a device with more than one function, (3) an adjustable focus device, (4) an adjustable angle device, (5) elastic contact points, (6) an LED heat solution, (7) installation of heat sensitive parts, and (8) extension means. The copending and patented applications include U.S. patent application Ser. Nos. 13/367,758, 13/367,687, 13/296,508, 13/296/469, 13/295,301, 13/021,107, 12/950,017, 12/951,501, 12/938,564, 12/886,832, 12/876,507, 12/771,003, 13/021,124, 12/624,621, 12/622,000, 12/318,470, 12/914,584, 12/834,435, 12/292,153, 12/907,443, 12/232,505, 11/806,711, and 11/806,285. U.S. Ser. No. 13/295,301 is for a h device having built-in digital data means and powered by an unlimited power source of the light device. U.S. Ser. No. 13/296,508 is for a device having built-in digital data means and powered by an unlimited power source of an LED bulb. U.S. Ser. No. 13/296,469 is for a device having built-in digital data means and powered by an unlimited power source of a lamp holder. Finally, U.S. Ser. No. 12/951,501 is for a lamp holder having a built-in LED night light.

These applications are further related to the inventor's copending and patented U.S. patent application Ser. No. 13/162,824 (light device with display means, track-means, and removable LED-unit(s)), Ser. No. 12/938,628 (LED light fixture has outlet(s) and removable LED unit(s)), Ser. No. 12/887,700 (light fixture with self-powered removable LED unit(s)), Ser. No. 12/149,963 (now U.S. Pat. No. 7,722,230), Ser. No. 12/073,095 (now U.S. Pat. No. 7,726,869), Ser. No. 12/073,889, Ser. No. 12/007,076 (now U.S. Pat. No. 7,726,841), Ser. No. 12/003,691 (now U.S. Pat. No. 7,726,839), and Ser. No. 12/894,865.

The above-listed patent applications are further related to the inventor's copending or patented U.S. patent application Ser. Nos. 12/624,621, 12/622,100, 12/318,471, 12/318,470, 12/318,473, 12/292,153, 12/232,505, 12/232,035, 12/149,963, 12/149,964, 12/073,095, 12/073,889, 12/007,076, 12/003,691, 12/003,809, 11/806,711, 11/806,285, 11/806,284, 11/566,322, 11/527,628, 11,527,629, 11/498,874, 12/545,992, 12/806,711, 12/806,285, 12/806,284, 12/566,322, 12/527,628, 12/527,629, 12/527,631, 12/502,661, 11/498,881, 11/255,981, 11/184,771, 11/152,063, 11/094,215, 11/092,742, 11/092,741, 11/094,156, 11/094,155, 10/954,189, 10/902,123, 10/883,719, 10/883,747, 10/341,519, 12/545,992, 12/292,580, 12/710,918, 12/624,621, 12/622,000, 12/318,471, 12/318,470, 12/318,473, 12/292,153, 12/710,561, 12/710,918, 12/711,456, and 12/771,003.

The current invention is an LED bulb that may incorporate features described in the above-listed copending or patented cases of the inventor as well as related or equivalent features, functions, or replacement parts. Additional features of the invention include the following:

1. The LED bulb has the property that the LED bulb can twisted over an additional degree or twist angle after the LED Bulb's contact-point touches an electrode in the holder, enabling horizontal positioning over an angle of more than 360 degrees when positioning a light beam to desired area(s) to obtain a wider adjustment angle or wider range of adjustment directions, and with the additional feature of incorporating an adjustable focus means to cause the LED light beams or image to provide different light performances on any desired locations or area(s). The LED bulb may include a rotatable LED Ball with two arms so that an LED bulb of preferable geometric shape and construction may also have a vertical adjustment angle of up to more than 360 degrees so that the LED bulb's plurality of light beams can cover all x-y-z axis areas by at least one of light beam or a plurality of the light beams and illuminate both nearby and faraway or remote areas.

2. The LED Bulb may have one or more than one light source arranged in the LED bulb to provide a desired light performance as described in the inventor's copending U.S. patent applications, which describe a night light with more than one LED light source or LED projection assembly. A difference with respect to the prior arrangements is that a night light has prong means for outlet installation and does not have extendable/retractable means.

3. The current invention includes an LED Bulb with adjustable focus means to enable light beams from the same LED bulb to be emitted to any desired surface(s) with a desired light performance, including a desired brightness, size, light spots, color, or lit-areas. The same light beam output from the same LED bulb with focus adjustable means enables a user to create different light patterns, light paths, light brightness, light performance, and light direction.

4. The LED bulb of the current invention has extendable means, such as an extension tube, telescope tube or equivalent extendable and receivable means that enable the electric parts and accessories of the LED bulb to keep away from the LED's heat, and away from any light blocking-means in the LED bulb, such as a curtain, shade, glass, recess lighting cylinder tube, or other blocking-means that would otherwise block a motion-sensor lens, remote control signal, or light beam emission direction, the extendable means further keeping the LED bulb's circuit board/control means/IC means/switch means/sensor means/electric parts or assembly means away from the LED-units to thereby prevent heat from affecting desired functions or performance, such as the performance of a motion sensor, PIR sensor head, Fresnel lens, or LED-unit light beam emitting direction.

5. The LED bulb of the current invention may have an extractable/extendable/movable means to put heat sensitive or light sensitive parts away from the LEDs' heat, light shade, curtain, glass, decorative material, ceiling blocking means, or any other light blocking means that might interfere with operation of the LED bulb or LED bulb's related parts and accessories. The extendable or extractable means preferably being situated at the front of the LED bulb, although the position will depend on the different requirements and different considerations with respect to heat and light blocking-means, and the ability to offer more space to install the preferred electric parts and accessories, the extra length provided by the extractable/extendable/movable means having the effect of moving sensitive parts far away from the heat source or blocking means so that the LED bulb can overcome the effects of heat and blocking means for any application or installation.

6. The current invention is different from all market-available LED bulbs which offer illumination that only covers an adjacent area starting from the LED Bulb to a certain distance (illumination surrounding the LED bulb) and do not offer illumination or images in areas in certain directions, angles, and distances that are faraway or remote from the LED bulb.

The current invention offers any combination of nearby area illumination and faraway area illumination.

7. The current invention provides an LED bulb that may have more than one light beam output to different areas, directions, and locations, including areas that may not be adjacent, linked, or situated together. By offering illumination of more than one area, the invention allows people to save energy by providing illumination exactly where needed. For example, stair lighting only requires up-or-down two-direction illumination. Rest areas do not need light at all, and the stair-lighting may further have a built in motion sensor having sensitivity up to 10-30 feet, which is enough to cover one flight of stairs (normally is 18 steps). One light beam from an LED bulb can reach nine steps going up and one light beam from the same LED bulb can reach nine steps going down. This is enough illumination because each UP or DOWN stair are been illuminated by each floor's one LED bulb, with two different of light beams covering nine steps up and nine steps down. This provides pretty a good power saving device while the motion sensor device ensures that only one of the two light beams needs to be output from the LED bulb at any one time.

Hence, the current invention can output at least one or a plurality of light beams from one LED bulb to nearby areas, remote areas, faraway areas, or any combination of these areas with adjustable angle, adjustable focus, elastic contact points, a rotate/spin/tilt frame or support or base to obtain a desired light beam emission direction, and extendable/retractable means to install all parts and accessories away from heat or blocking means, thereby providing a lighting device that lets all light beams be emitted to areas where they are needed for illumination, unlike conventional LED bulbs that can only illuminate nearby areas which start from the LED-bulb to a certain limited distance areas (conventional LED bulbs have insufficient brightness to emit light over long distances unless an optics lens or lens assembly is provided to project light beams to remote or faraway distances which the current market items cannot accomplish).

The current drawings are identical to those in the above-listed copending or patented applications, but with changes to the input end of the power source or power signal, so one can easily refer to the above applications for additional details of the LED bulb applications. It will be appreciated that any LED bulb concepts described in the copending or patented applications of the inventor, as well as same or equivalent-function concepts and, features may still fall within the scope of the current invention for LED bulb applications.

DETAILED DESCRIPTION OF THE PREFERRED EMBODIMENTS

From the above background and drawing discussion, those skilled in the art will appreciate that the current invention offers a big improvement over conventional market-available LED bulbs that can only offer nearby area illumination, unlike the current invention that can use one LED bulb to offer nearby illumination, faraway illumination or image projection, or both.

Also, the current invention provides for emission of more than one light beam from LED bulb, and more than one control means for selecting the light beams for different conditions or functions, such as power failure, remote control, infrared control, blue-tooth communications with a mobile phone, and motion sensing to trigger at least one of the light beams to illuminate or project an image to selected areas.

Additional features and embodiments are as follows:

Feature 1: The LED bulb may consist of at least one LED as a light source that emits light beams to desired areas or locations with predetermined illumination, function, time period, and performance. The LED bulb may further have parts or accessories that allow for projection and adjustment, including optic means, a lens, an adjustable focus means, twist means, rotate means, an elastic contact end, more than one output light beams, a rotating frame, a bulb shade with arms for enabling rotation, a twist bulb base, support for a shade, an LED assembly, LED tubular means, adjustment means, projection means, digital data display means, LCD display means, digital camera means, data storage means, data projection optics means, sensor means, switch means, IC means, circuit means, extend means, extractable means, filter means, stencil means, cutout means, painting means, motion sensor means, remote control means, blue-tooth means, and Internet wireless means, to enable the LED bulb to emit the light beams, images, time, data, digital messages, and Internet data as desired to nearby areas or remote distance areas for illumination.

The LED bulb connects with a power source by contact means in the base to enable the LED bulb to emit light beams to areas with an adjustable angle coverage, preferably in any direction relative to an x-y-z axis coordinate system, or any combination as required for preferred light performance, effects, and functions.

Furthermore, the direction of at least one of the output light beams from the LED bulb can be adjusted to a certain area, location, distance when adjusting the above-listed component(s) of the LED bulb.

The base of the LED bulb may be in the form of male insert means to fit into the female receiving means for a desired construction.

The said LED Bulb at least has adjustable parts to enable the at least one light beam to change position, direction, or orientation.

Feature 2 The LED bulb as above listed (Feature #1), may be provided with an elastic contact means which allows the LED bulb to adjust the light beam position, location, and direction to certain areas in three dimensions.

Feature 3: The LED bulb as above listed (Feature #1) may include extendable, extractable means to enable parts to be extended away from the LED Bulb and that have a configuration and construction that allows installation of some electric parts and accessories, sensor means, motion sensor means, remote control means, heat sensitive means so as to overcome heat and the blocking effects of a lightshade, lens, curtain, glass, cover, cavity depth, or any other blocking means that might interfere with operation of the LED bulb.

Feature 4: The LED bulb as above listed (Feature #1) can incorporate optics means, an optics lens, or an optics lens assembly with parts and accessories that cause the same light beam to have different light performance.

Feature 5: The LED bulb as above listed (Feature #1), may include a focus adjustment means that enables the same light beam to present different light performances at certain locations, positions, and areas with desire brightness, size, and performance.

Feature 6: The frame and support means of the LED Bulb as above listed (Feature #1), may be arranged to enable the bulb to twist, tilt, rotate, spin, and angle-adjust e with hold means to overcome any heat issues and facilitate a change in the desired angle.

Feature 7: The base of the LED bulb as above listed (Feature #1), can have any construction including screw type, pin type, poles type, multiple pole type, twist type, and bayonet type construction.

Feature 8: The LED bulb as above listed (Feature #1) may have more than one light beam output so as to emit more than one light beam to locations, areas, and positions that are remote from the LED Bulb.

Feature 9: The LED bulb as above listed (Feature #1) may include an LED tube means that serves to prevent light leakage from the projection means and ensures that LED light beams passing through the optics means, optics lens, display unit, image forming means, LCD display, Lcos image, and/or digital display of the projection means can be emitted out of the LED Bulb to desired locations, positions, and areas.

Feature 10: The LED bulb as above listed (Feature #1) may include any of a sensor means, switch means, motion sensor means, remote control means, blue-tooth means, photo sensor means or other market-available electric parts and accessories incorporated with circuit means to cause the LED light source to emit light so as to provide predetermined light functions, performance, and effects.

Feature 11: The extension or retractable means of the LED bulb as above listed (Feature #1) can be installed with select electric parts and accessories, with the LED light source being arranged in the LED bulb in an up, down, or horizontal arrangement.

Feature 12: The LED bulb as above listed (Feature #1) can illuminate any combination of nearby or faraway areas to provide both nearby and faraway area lighting effects.

Feature 13: The LED bulb as above listed (Feature #1) may have more than one function that not only offers illumination for nearby areas or remote distance areas, but that also may incorporate motion sensor, remote control, blue-tooth, and other functions.

Feature 14: The extendable and retractable means of the LED bulb may include any heat-sensitive or light blocking-means-affected circuit means, IC means, electric parts and accessories, switch means, sensor means, remote control means, blue-tooth means or equivalent trigger means, extra LEDs, RF receiving means, IR sensor means, or other control means to overcome the effects of the LED's heat or surrounding blocking-means such as a lighting fixture's shade, cover, glass, frame, support, ceiling, wood piece, metal piece, or plastic pieces. The extend means can extend to a certain distance away from the LED's heat or any blocking-means so that the blocking means will not interfere with delivery of the light beams or electric signal delivery direction that might affect the pre-determined functions, performances, and effects of the LED bulb.

Feature 15: The LED bulb may include angle, position, orientation, direction, or focus-adjust means incorporated with optics means, an optics lens, a projection assembly, or an LED assembly. The LED bulb emits the light beam to desire areas in a preferred combination of nearby illumination, faraway illumination, nearby image projection, or faraway image projection, the projection including projection of a digital data image, movie image, internet digital data image, time display, motion picture image, or colorful image.

Feature 16: The LED light beam of the preferred LED bulb may further be triggered by control means which may be selected from one or more of a motion sensor, remote control, infrared sensor, blue-tooth means, power failure means and built-in direct current power storage means, sensor means, switch means, or other electric parts and accessories.

Figures 1, 2:
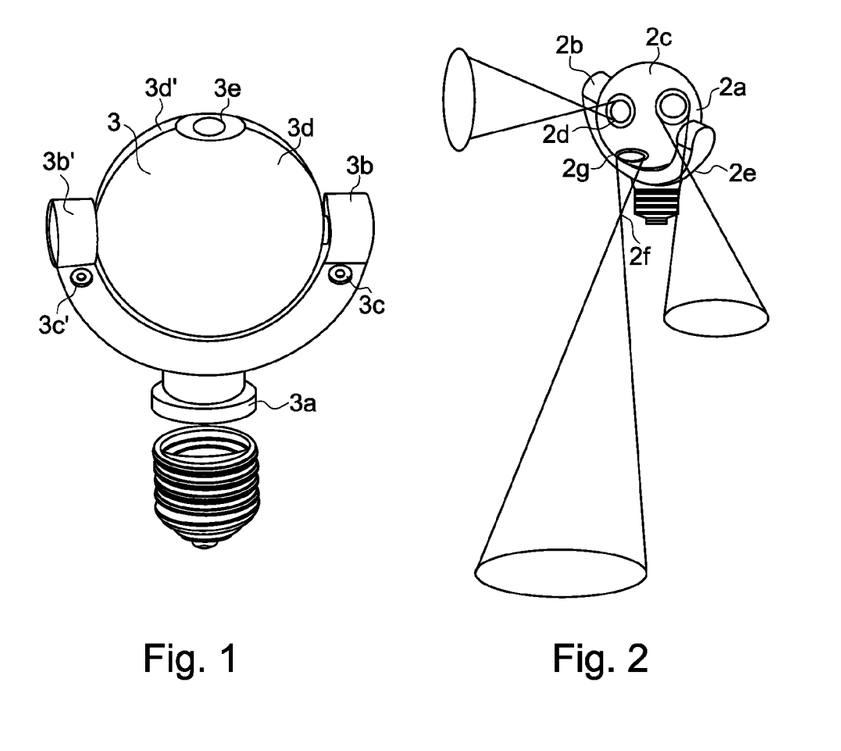
FIG. 1 shows a first preferred embodiment of an LED bulb having a ball shaped unit with two arms to join with a frame (having any shape or design) to enable the ball to rotate by more than 360 degrees, with a base that is in the form of a screw base of a male type assembly that is screwed into a female receiving part for power supply.
FIG. 2 shows the manner in which the first preferred embodiment of the LED bulb emits a plurality of light beams out from the ball shape body to different areas that are far away from the LED bulb through the use of an optics lens or optics means to get a desired light performance.

The following detailed description of the drawings include subject matter that was originally included as notes in the original drawings:

FIG. 1 shows a first preferred embodiment of the LED bulb of the invention having a ball-shaped unit with two arms to join with a frame (preferred any shape design) to enable the ball to rotate by more than 360 degrees in order to adjust a projection angle. The base is in a form of a screw base of male type for assembly with female receiving parts that supply power.

FIG. 2 shows the manner in which the LED bulb of the first preferred embodiment emits light from the ball shape body to different areas far away from the LED bulb using an optics lens and optics means to help get a desired light performance.

FIG. 3 shows further details of the first preferred embodiment, including project means, optics means, lens, metal conductive means, a rotating frame, rotatable base, and a screw base to enable adjustment of the angle at which light beams are emitted by the LED bulb.

Figure 3A:
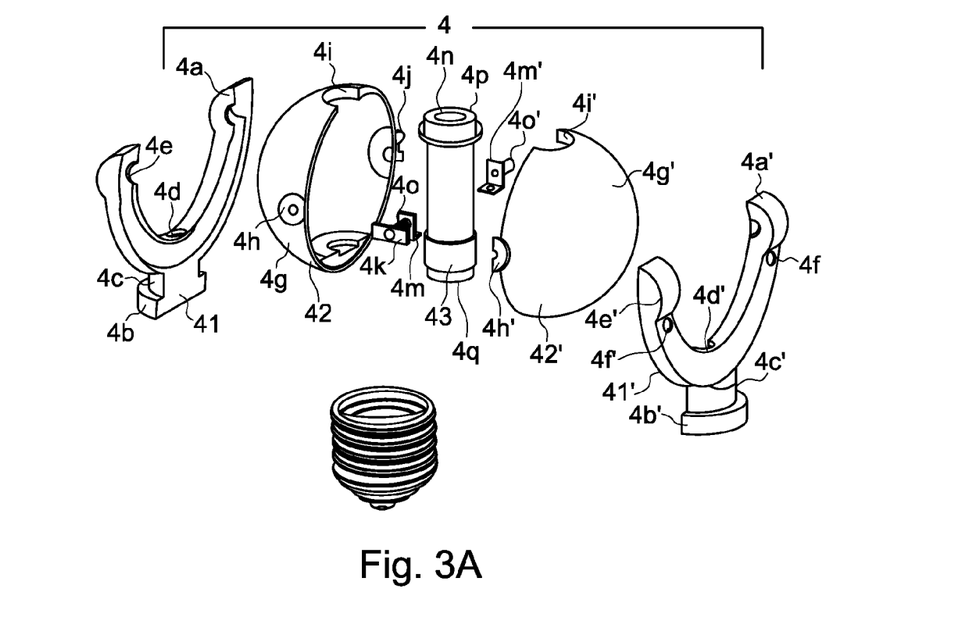
FIG. 3A shows details of the construction of the first preferred embodiment of the LED bulb, including projection means, optics means, a lens, metal conductive means, a rotating frame, a rotatable base, and a screw base that enables adjustment of an angle of the LED bulb.
Figure 3B:
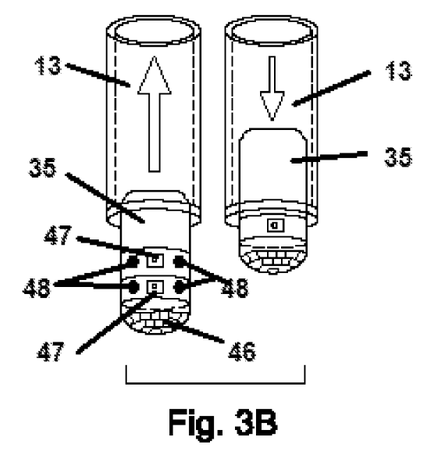
FIGS. 3B, 3C, 3D, 3E, 3F, 4A, FIG. 4B, and 4C show a second preferred embodiment having extend means at the front to allow some heat-sensitive parts, a motion sensor, remote controller receiver parts, blue-tooth parts, an extra LED(s), digital recording means, track means, auto moving motors means, and other electric parts and accessories to be moved so as to overcome the effects of the LED's heat or of blocking means (such as the lighting fixture's shade, curtain, cover, glass, plastic piece, wood piece, or metal piece) that might block electric signal or light beam delivery directions, the extend means having a sufficient length to overcome the heat and blocking means.
Figure 3C:
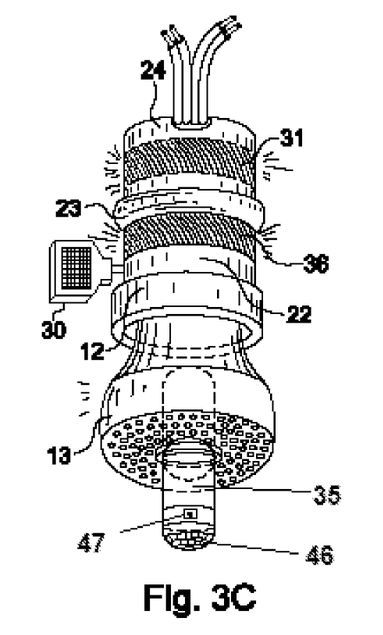
Figure 3D:
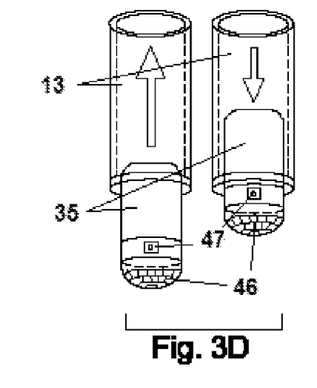
Figure 3E:
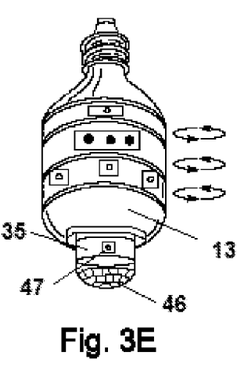
Figure 3F:
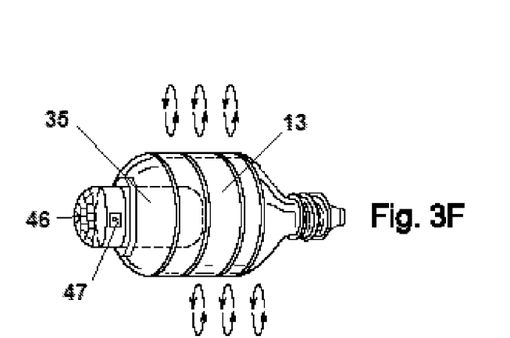
Figure 4A:
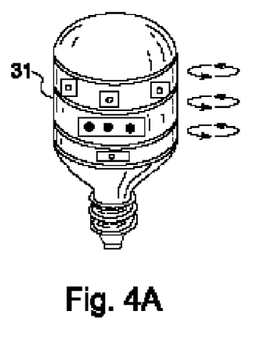
Figure 4B:
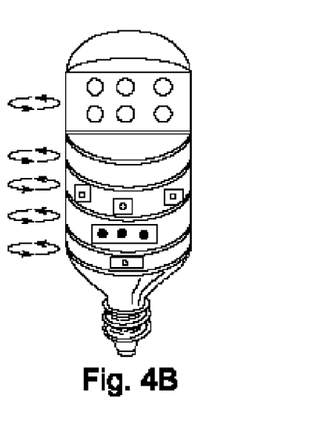
Figure 4C:
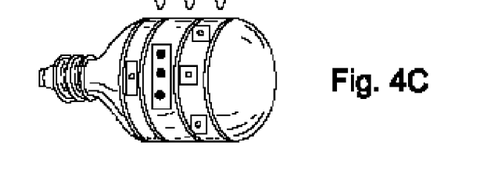
Figure 5A:
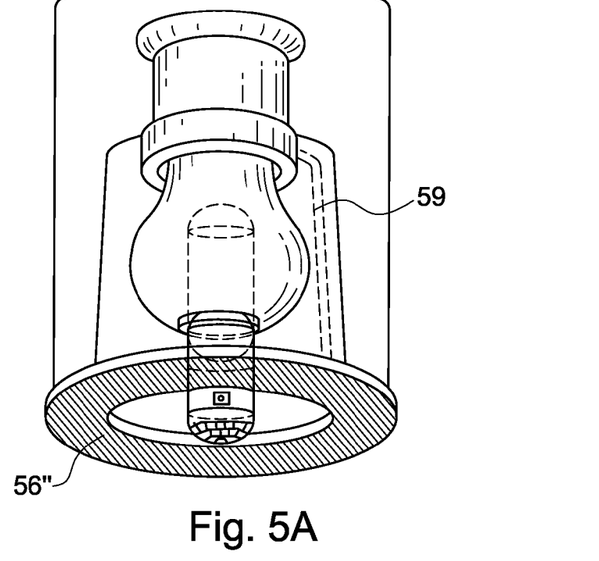
FIGS. 5A, 5B, 5C, and 5D show examples of surrounding area's blocking means that can block out a light beam or electric-signal delivery direction.
Figure 5B:
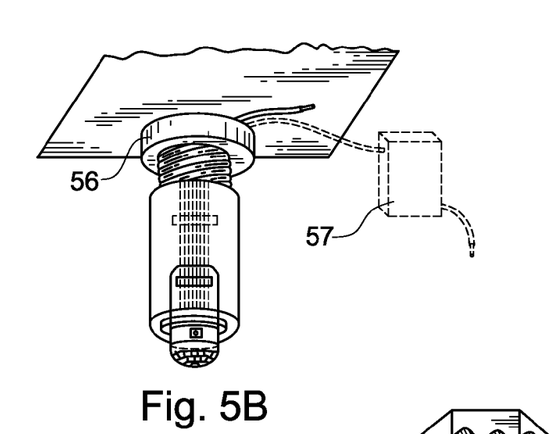
Figure 5C:
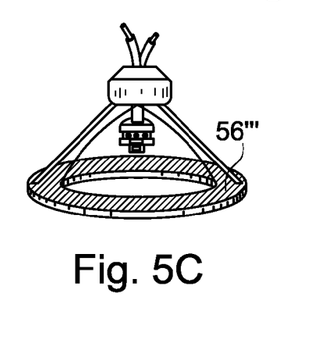
Figure 5D:
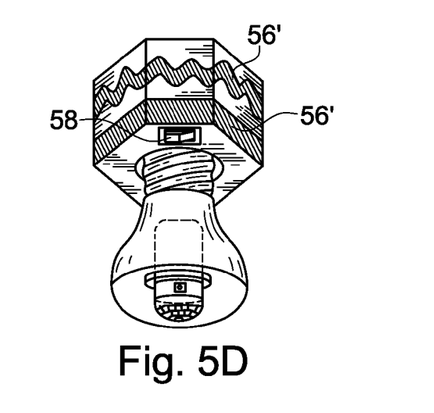

FIGS. 3A, 3B, 3C, 3D, 3E, 4A, and 4B show a second preferred embodiment having extendable and retractable means 35 in front to allow some heat-sensitive parts such as a motion sensor, remote controller receiver, or blue-tooth means 46, camera(s) 47, other sensor(s) 48, or extra LED(s), digital recording means, track means, auto moving motors means or other preferred electric parts and accessories (not shown) to be installed within and moved to overcome the effects of the LED's heat or the effects of blocking-means 13 such as a lighting fixture's shade, curtain, cover, glass, plastic piece, wood piece, metal piece that would otherwise block an electric signal or light beam delivery direction. As shown in FIG. 3B, the blocking-means 13 is in the form of an LED bulb cover, which is plugged into a socket 12 including additional illuminating elements 31 and 36, sensor means 30, and rotatable housing elements 22 and 24.

FIGS. 5A, 5B, 5C, and 5D show examples of some of the surrounding area's blocking-means that will block light beam or electric-signal delivery direction, and that can be overcome by the extend means of the preferred embodiment.

Figure 6A:
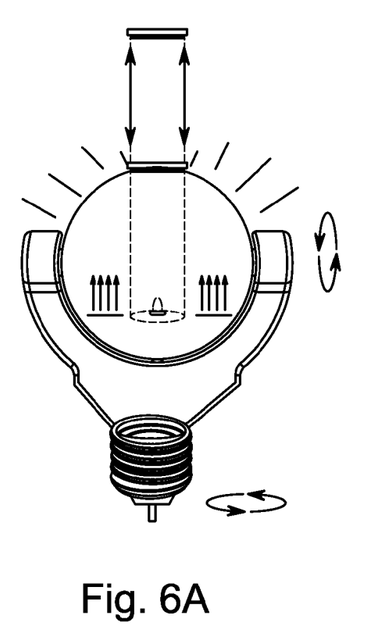
FIGS. 6A and 6B show a third preferred embodiment, including details of the LED's heat flow and the manner in which the extend means overcomes the LED's heat and blocking means, and also a rotating frame and base that allows light beams to be emitted in any direction of an x-y-z axis coordinate system without the need for an elastic contact point of the base.
Figure 6B:
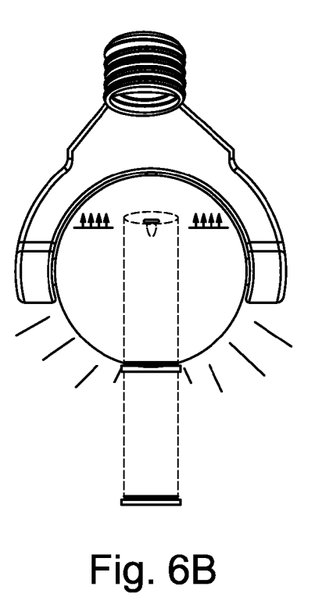
Figure 7A:
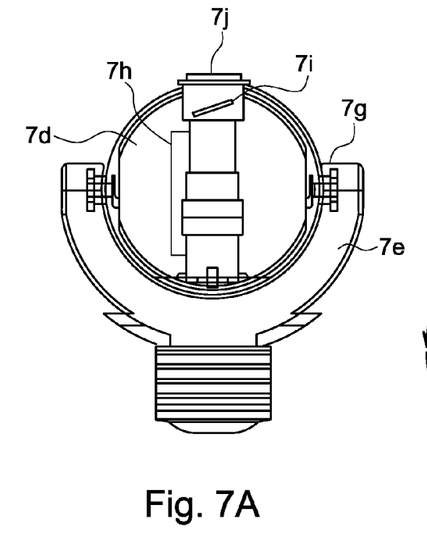
FIGS. 7A, 7B, 7C, and 7D show different configurations of the LED ball for top/side/down installation so that the LED bulb(s) still can emit the light beam(s) to wherever needed. In addition, in this embodiment, any one of the LED light beams can present different light patterns by applying an adjustable focus means to one of the light beams in order to vary the size, brightness, location, distance, clearance, or even color (by adding a filter or other optics means) to the light beams.
Figure 7B:
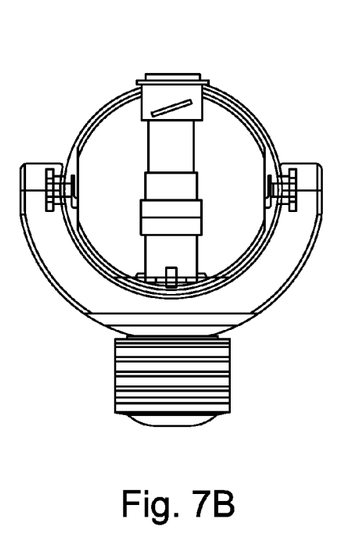
Figure 7C:
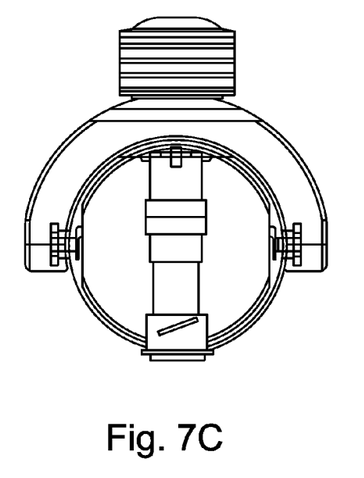
Figure 7D:
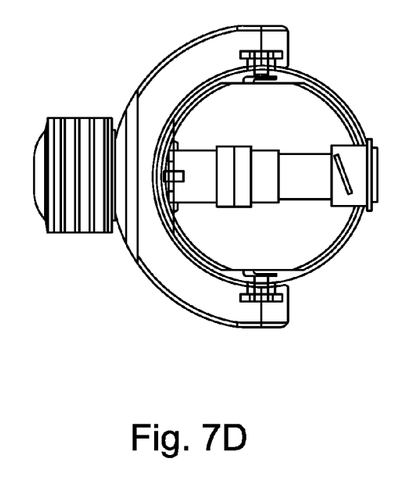

FIGS. 6A and 6B show a third preferred embodiment which shows details of the LED's heat flow and the manner in which the extend means overcome the LED's heat flow and the effect of blocking-means, as well as a rotating frame and base that allow the light beams to be emitted to any direction in three dimensions without any problem, or even the need for an elastic contact point of the base.

FIGS. 7A to 7D show different installations of the LED ball in top/side/down orientations so that the LED Bulb(s) still can emit light beam(s) to wherever needed. Other features are that any one of the LED light beams can present different light pattern(s) while apply the adjustable focus means can have a different light performance, including different size, brightness, location, distance, clearance, or even color when adding a filter or other optics means.

Figure 8A:
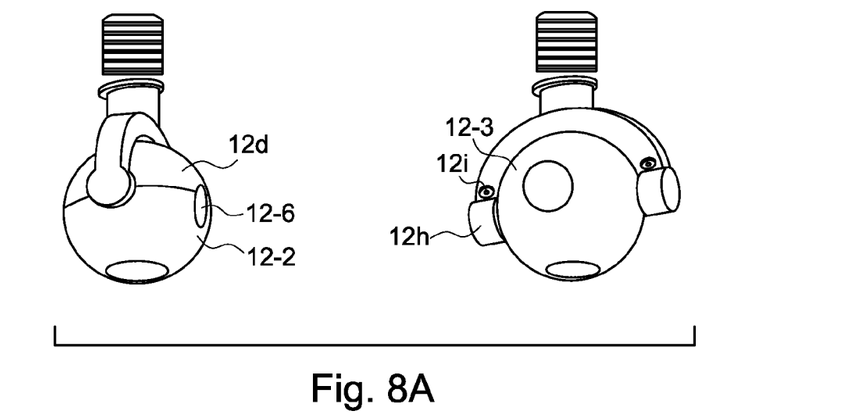
FIGS. 8A, 8B, and 8C show an LED bulb that emits a plurality of beams, some of which have special functions such as to provide power fail lighting, auto tracking, remote control, RF transmission, infrared transmission, and blue-tooth communications.
Figure 8B:
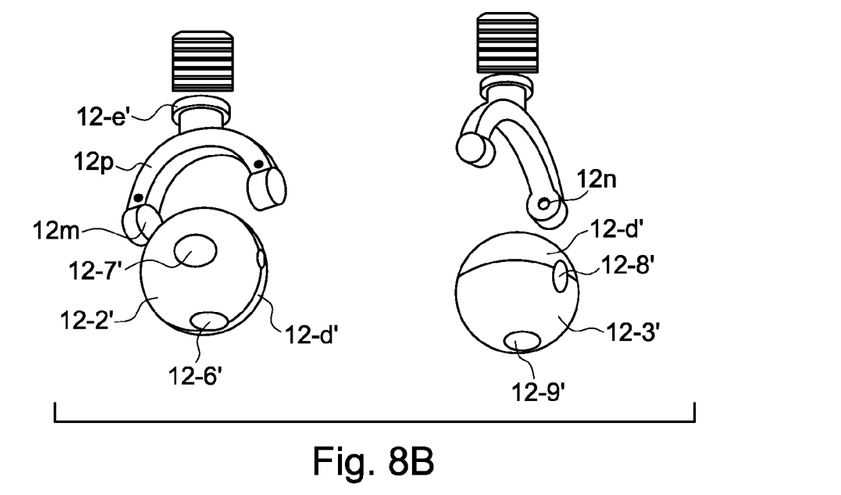
Figure 8C:
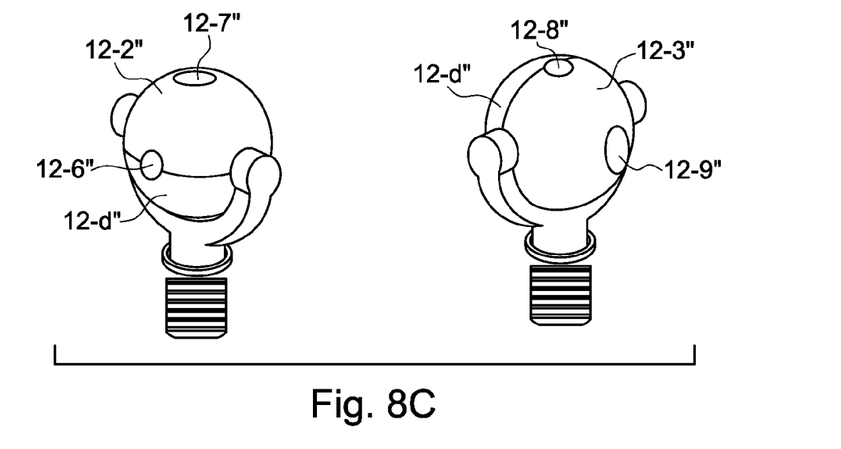

FIGS. 8A to 8C show an LED bulb from which a plurality of light beams are emitted, with different LED light beams having special functions such as a power fail illumination function, auto tracking, remote control, RF transmission/reception, infrared emission, blue-tooth communications, and so forth.

Figure 9:
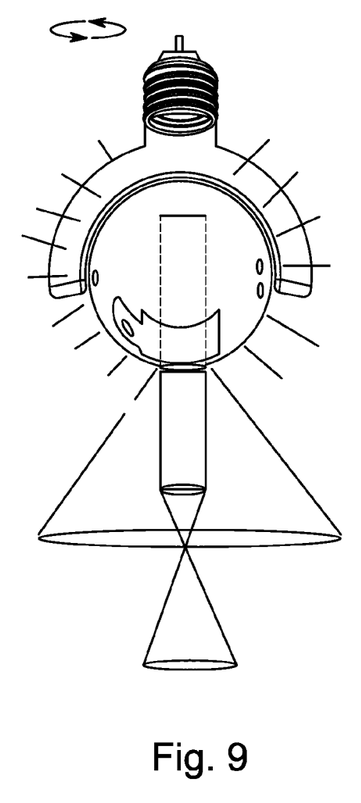
FIGS. 9 and 10 show other embodiments which have different geometric shapes of LED bulb and different rotating constructions to enable the LED light beams to be emitted to a certain position, and elastic contact points to overcome limitations of the rotating frame, rotating arms, or rotating base design. Also, these embodiments may emit light beams having different light performance or patterns through the use of focus adjustable means.
Figure 10:
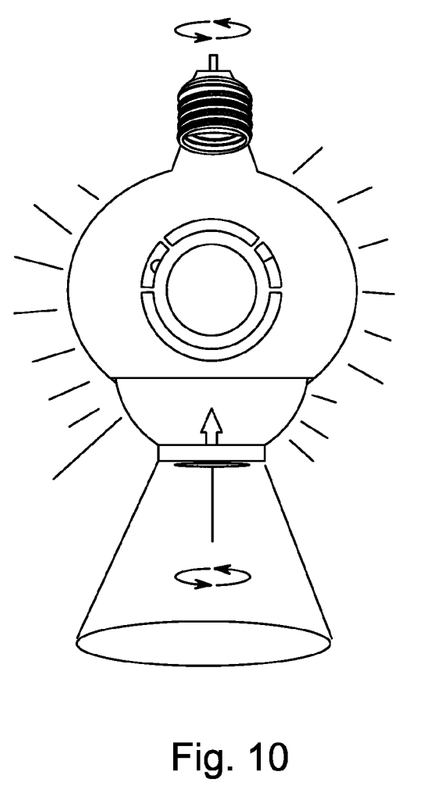

FIGS. 9 and 10 show other embodiments which have different geometric shapes of LED bulb and different rotating construction to cause the LED light beams to be emitted to a certain position and elastic contact points to help overcome limitations of the rotating frame, rotating arms, and rotating base design. Focus adjustment means enable one light beam to have different light performance or patterns.

Figure 11A:
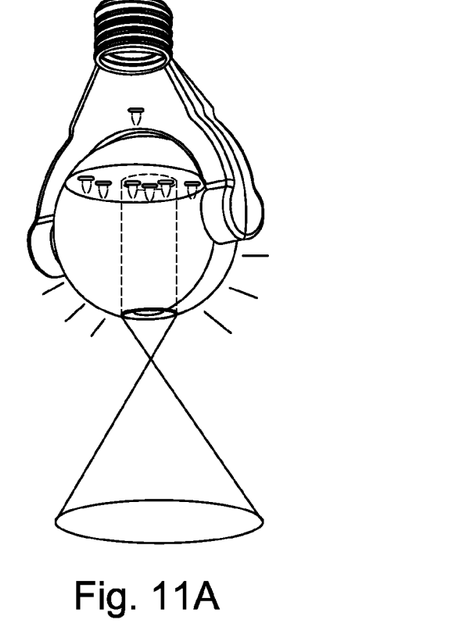
FIGS. 11A, 11B, and 11C show a preferred embodiment which can offer nearby and remote area illumination or images at the same time. The plurality of LEDs light sources are arranged inside the projection assembly, which includes telescope means, tubular means, and extend means for remote or faraway illumination or image projection. Some of LEDs provide high power output while others provide low power output to offer nearby illumination or images comparable to those of a normal current-market LED bulb or incandescent bulb.
Figure 11B:
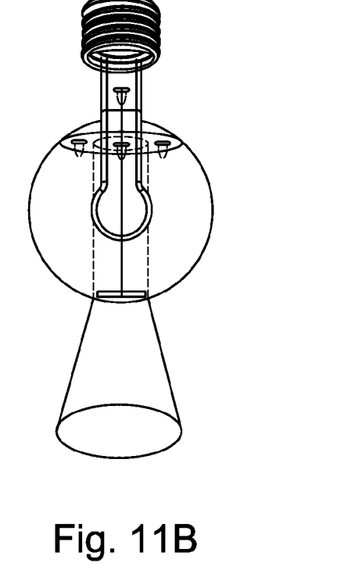
Figure 11C:
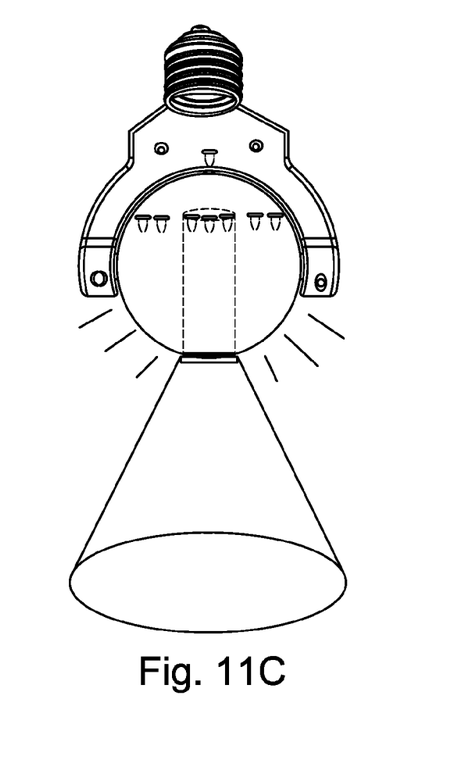

FIGS. 11A to 11C show a preferred embodiment which can offer nearby and remote area illumination or images at the same time. The plurality of LED light sources are arranged inside the projection assembly, telescope means, tubular means, and extend means and projected to provide the remote or faraway illumination or image. Some of LEDs have a high power output while others have a low power output to offer the nearby illumination or images comparable to those of a conventional LED bulb or incandescent bulb. Hence, the current invention can use one single LED bulb to provide more than one area with illumination or images.

The invention claimed is:

1. An LED bulb, comprising:
   at least a first LED and a second LED;
   projection means for projecting light beams from the first LED to a remote area, the projection means including optical elements and a lens for projecting the light beams from the first LED to the remote area, and at least one of a tube, digital data display, and LCD display, wherein light beams from said second LED is emitted or projected to a nearby area;
   extendable and extractable means for housing components that are sensitive to heat from the LEDs or whose operation is vulnerable to interference from light or signal blocking elements, said extendable and extractable means being movable to move the components away from the heat or blocking elements;
   position, orientation, or angle adjustment means for adjusting a position, orientation, or angle of said light beams projected to the remote area from the first LED; and
   a base insertable into a lamp holder for connected the LED bulb to a power source.

2. An LED bulb as claimed in claim 1, further comprising elastic contact means that enable the LED bulb to be rotated upon insertion into the lamp holder to adjust a direction of the light beam in three dimensions.

3. An LED bulb as claimed in claim 1, further comprising optics means for varying a light performance of a light beam emitted by the LED bulb.

4. An LED bulb as claimed in claim 3, wherein the optics means is a focus adjustment means for adjusting a focus of the light beams from the first LED to vary a brightness, size, and performance of the light beams at desired locations or areas.

5. An LED bulb as claimed in claim 1, wherein the base is a screw type, pin type, pole type, multiple pole type, twist type, or bayonet type light bulb base.

6. An LED bulb as claimed in claim 1, wherein the LED bulb emits more than one light beam to locations, areas, and positions that are remote from the LED Bulb.

7. An LED bulb as claimed in claim 1, wherein the tube of the projection means prevents light leakage from the projection means and ensures that LED light beams passing through the optics means, optics lens, and a display unit, image forming means, LCD display, Lcos image, and/or digital display of the projection means are emitted out of the LED Bulb to desired locations, positions, and areas.

8. An LED bulb as claimed in claim 1, further comprising any of a sensor means, switch means, motion sensor means, remote control means, blue-tooth means, photo sensor means incorporated with circuit means for causing the first and second LEDs to emit light so as to provide predetermined light functions, performance, and effects.

9. An LED bulb as claimed in claim 1, wherein the extension or retractable means of the LED bulb is arranged in the LED bulb in an up, down, or horizontal arrangement.

10. An LED bulb as claimed in claim 1, wherein the LED bulb not only offers illumination for nearby areas and remote areas, but also incorporates additional functions including one of a motion sensor, remote control, and blue-tooth function.

11. An LED bulb, comprising:

at least one LED;

extendable and extractable means for housing components that are sensitive to heat from the LEDs or whose operation is vulnerable to interference from light or signal blocking elements, said extendable and extractable means being movable to move the components away from the heat or blocking elements so that they do not interfere with operation of the components; and a base insertable into a lamp holder for connected the LED bulb to a power source.

12. An LED bulb, comprising:

at least a first LED and a second LED;

projection means for projecting light beams from the first LED to a remote area, the projection means including optical elements and a lens for projecting the light beams from the first LED to the remote area, and at least one of a tube, digital data display, and LCD display, wherein light beams from said second LED is emitted or projected to a nearby area; and a base insertable into a lamp holder for connected the LED bulb to a power source.

* * * * *